United States Patent [19]

Zollinger

[11] Patent Number: 4,872,412
[45] Date of Patent: Oct. 10, 1989

[54] FERTILIZER INJECTING IMPLEMENT AND METHOD

[76] Inventor: Ezra J. Zollinger, 230 E. 3rd South, Logan, Utah 84321

[21] Appl. No.: 182,435

[22] Filed: Apr. 18, 1988

[51] Int. Cl.$^4$ ............................................. A01C 23/02
[52] U.S. Cl. .................................... 111/121; 111/84; 111/200
[58] Field of Search .................. 111/7, 52, 73, 69, 80, 111/84, 85, 56, 86, 61, 87

[56] References Cited

U.S. PATENT DOCUMENTS

| | | | |
|---|---|---|---|
| 655,323 | 8/1900 | Belanger | 111/85 |
| 1,416,331 | 5/1922 | Campbell | 111/87 |
| 1,747,525 | 2/1930 | Nagy | 111/87 |
| 2,861,527 | 11/1958 | Phillips | 111/87 |
| 3,799,079 | 3/1974 | Dietrich | 111/7 |
| 4,466,364 | 8/1984 | Hassenfritz | 111/73 |
| 4,538,532 | 9/1985 | Coker | 111/7 |
| 4,574,715 | 5/1986 | Dietrich | 111/85 |
| 4,592,294 | 6/1986 | Dietrich | 111/7 |
| 4,628,840 | 12/1986 | Jacobson | 111/7 |
| 4,656,957 | 4/1987 | Williamson | 111/7 |
| 4,671,193 | 6/1987 | States | 111/73 |
| 4,745,978 | 5/1988 | Williamson | 111/7 |
| 4,762,075 | 8/1988 | Halford | 111/73 |

FOREIGN PATENT DOCUMENTS

| | | | |
|---|---|---|---|
| 2742193 | 3/1979 | Fed. Rep. of Germany | 111/86 |
| 3610979 | 10/1987 | Fed. Rep. of Germany | 111/85 |
| 542570 | 8/1922 | France | 111/86 |
| 2075811 | 11/1981 | United Kingdom | 111/73 |

OTHER PUBLICATIONS

R. L. Cook and W. C. Hulburt "Applying Fertilizers" The Yearbook of Agriculture 1957, The U.S. Department of Agriculture, Government printing office pp. 216, 217.

Primary Examiner—Danton D. DeMille
Attorney, Agent, or Firm—Philip A. Mallinckrodt; Robert R. Mallinckrodt

[57] ABSTRACT

A fertilizer injection implement has a flat, smooth, and unfluted coulter blade followed by a smooth-surfaced injection tube reinforced longitudinally and preferably slotted upwardly at the rear from its open discharge end. Apparatus for travel across cropland has a series of these implements mounted side-by-side, the coulter blades being rotatably mounted in respective forks that are articulatively attached to a frame in common by hanger bars and yoke bars. Press wheels are advantageously pivoted rearwardly of the respective implements for helping to close the cuts made in the soil.

4 Claims, 4 Drawing Sheets

FERTILIZER INJECTING IMPLEMENT AND METHOD

BACKGROUND OF THE INVENTION

1. Field

The invention is in the field of agricultural implements and is particularly concerned with fertilizer applicators.

2. State of the Art

Applications of fertilizer, liquid or gas, to agricultural croplands is ordinarily accomplished by broadcasting the fertilizer over the surface of the area concerned. This has been found to be very wasteful, since large percentages of the fertilizer are lost in one way or another. Although various implements have been developed to inject the fertilizer below the surface, practical limitations exist that dictate against their use in many instances.

SUMMARY OF THE INVENTION

The present invention provides an improved coulter type of fertilizer injecting implement wherein a fertilizer injecting tube is spaced directly behind a very thin, soil non-adherent, coulter blade, which cuts deeply into the soil of an unplowed field wherein there are recently emergent seedlings of a planted crop such as during fertilization in the spring of fall-planted wheat or barley. I have found that there is no need to follow any set pattern in traversing the field, since the plants are too young and numerous for the plantinng to be adversely affected by the passage of the implement thereover or by the resulting treatment of the soil. Instead, the fertilizer is deposited about the roots of the desired crop seedlings and buried there as the soil tends to return to position following passage of the implement. That some of the roots of the emergent seedlings may also be cut is of no consequence. It is advantageous that a press wheel be spaced behind the injection tube to help close the soil along the injection cuts.

A feature of the invention is the making of a very narrow and clean cut by a thin and smooth coulter blade to which the soil is non-adherent, with injection of liquid or gaseous fertilizer along the bottom of the cut and the retention of the deposited fertilizer thereat by either self-closing of the narrow cut or closing by a press wheel that follows the injecting tube.

A number of the implements are desirably mounted side-by-side for haulage about a field by a farm tractor, and are articilatively mounted in a fram on supporting wheels that can be used to raise or lower the coulter blades for transport purposes or for depth control.

THE DRAWINGS

The best mode presently contemplated for carrying out the invention is shown in the accompanying drawings, wherein:

FIG. 1 is a top plan view of fertilizer injector apparatus in which a number of the implements of the invention are ganged side-by-side to cover a wide swath as they are drawn across agricultural cropland, or even pastureland, by an ordinary farm tractor;

FIG. 2, a fragmentary rear elevation of the apparatus of FIG. 1 drawn to a larger scale;

FIG. 3, a vertical section taken on the line 3—3 of FIG. 2 as the apparatus is being drawn through a field with implements lowered to fertilizer injecting positions and showing the cut in the soil made by the coulter blade in the foreground;

FIGS. 4, 5, and 6, fragmentary vertical sections taken on the lines 4—4, 5—5, and 6—6, respectively;

FIG. 7, a fragmentary top plan view taken on the line 7—7 of FIG. 3 and showing only one of the implements;

FIG. 8, a fragmentary view in side elevation looking from the right in FIG. 1 and showing the implements raised for transport;

FIG. 9, a fragmentary vertical section taken along the line 9—9 of FIG. 1 and drawn to a larger scale, the intermediate wheel being raised for transport as in FIG. 8; and FIG. 10, a schematic transverse section taken along the ganged injection tubes at one side of the apparatus showing the fertilizer supply tank and control valve.

DETAILED DESCRIPTION OF THE ILLUSTRATED EMBODIMENT

Figure 1:
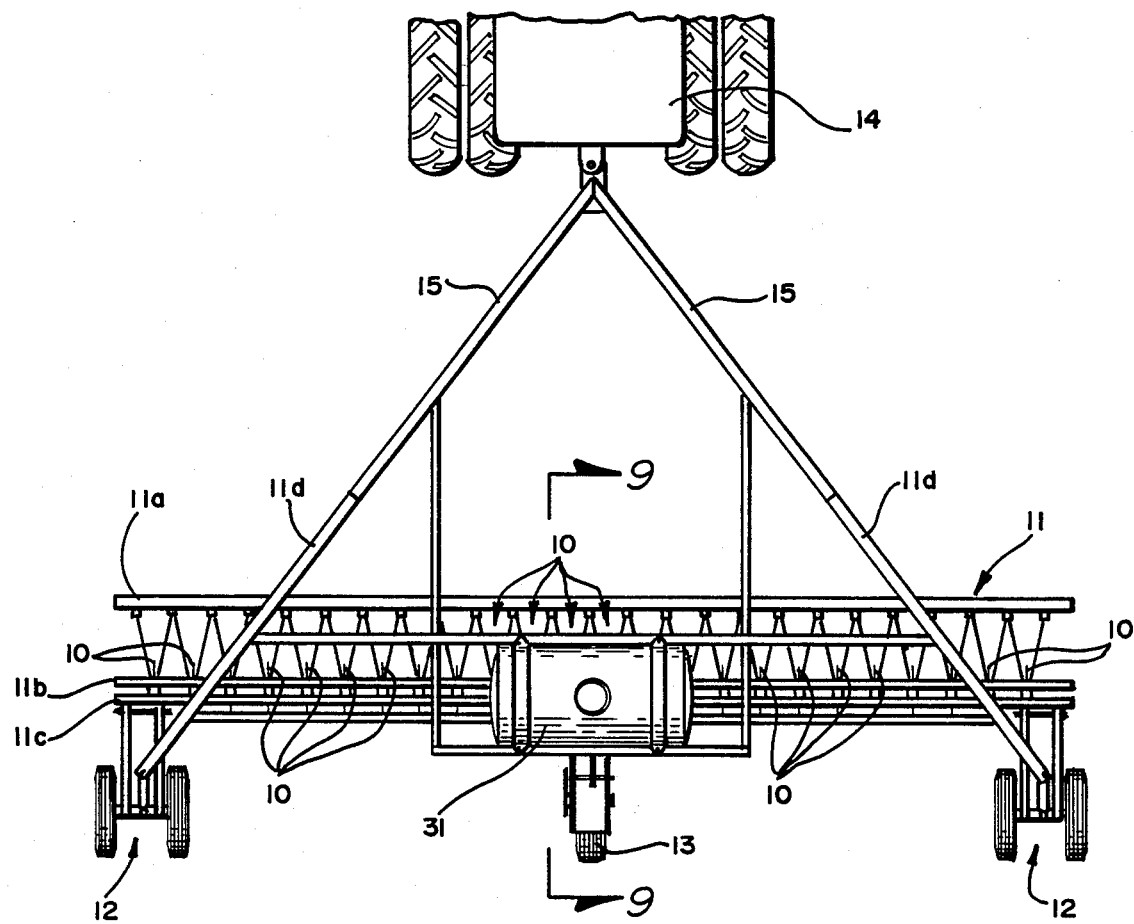

In the illustrated embodiment, liquid fertilizer injection apparatus, having several implements 10 of the invention ganged side-by-side across the width of a frame 11 that is provided with sets 12 of dual wheels and an intermediate, fertilizer-pump-operating, single wheel 13, is arranged to be pulled back and forth across agricultural cropland or pastureland by means of a usual farm tractor 14 hitched to a tongue 15 extending forwardly from frame 11.

Figure 2:
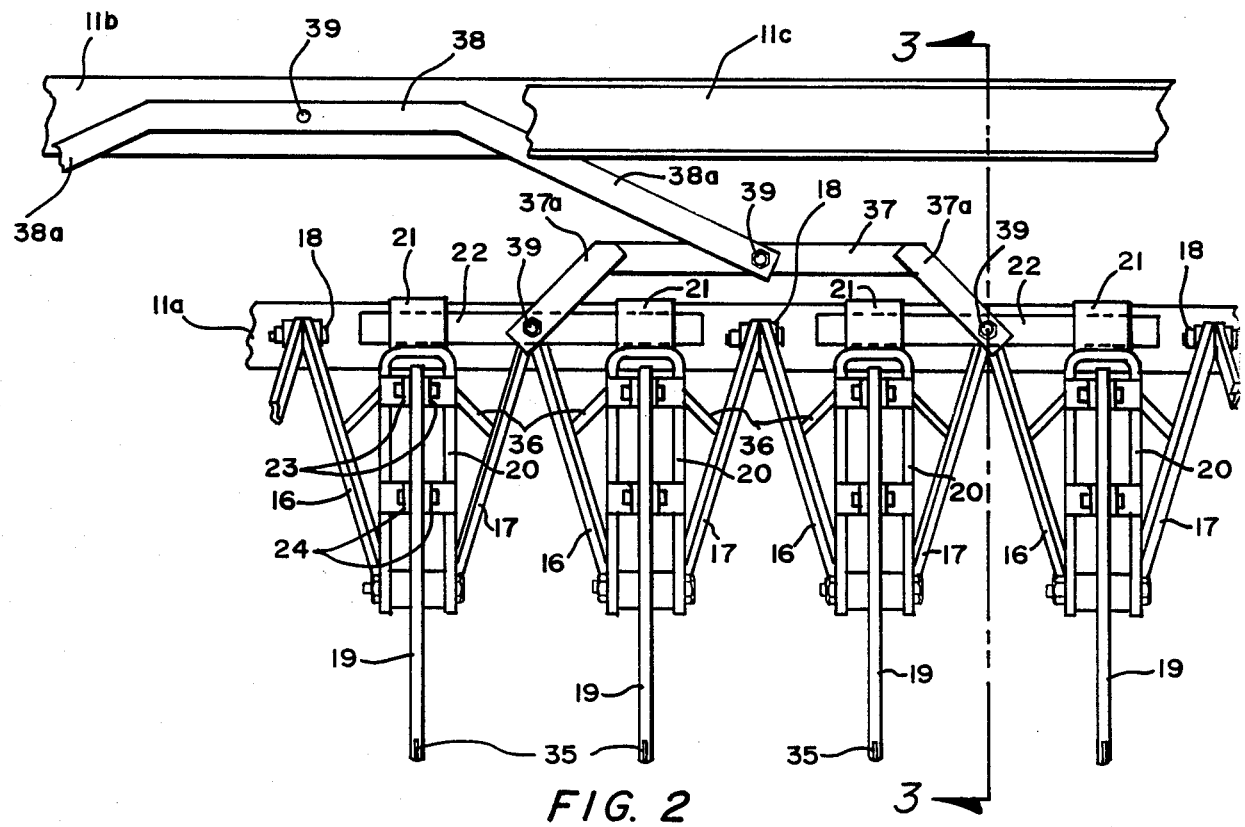

Each of the single implements of the invention is pivotally attached, as shown in FIG. 2, to a lower and forward transverse member 11a of frame 11. The attachment is by means of a rearwardly and downwardly extending set of convergent arm members 16 and 17, which are pivotally secured at their divergent forward ends to such frame member 11a by respective pivot pins 18. A pivot pin 18 serves each member in common with a member of a next adjoining implement 10. The set of arm members 16 and 17 rotatably mount a coulter blade 19 at their convergent rearward ends.

Rotatable mounting of such blade 19 is between the legs of a normally vertically positioned U fork 20, which has a receiver 21 at its upper end for one end portion of a yoke bar 22, whose other end portion passes through the receiver 21 of a next adjacent implement 10, see FIG. 2.

Figure 3:
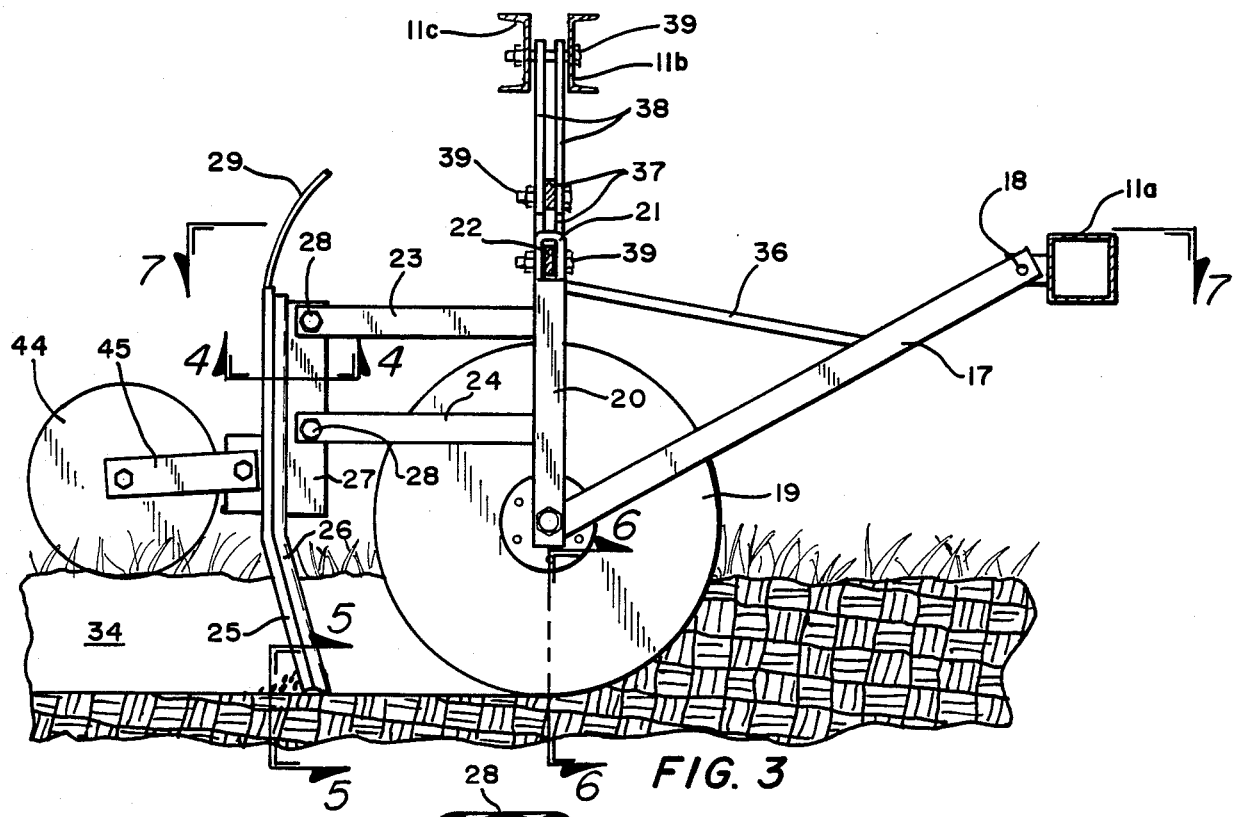
Figure 4:
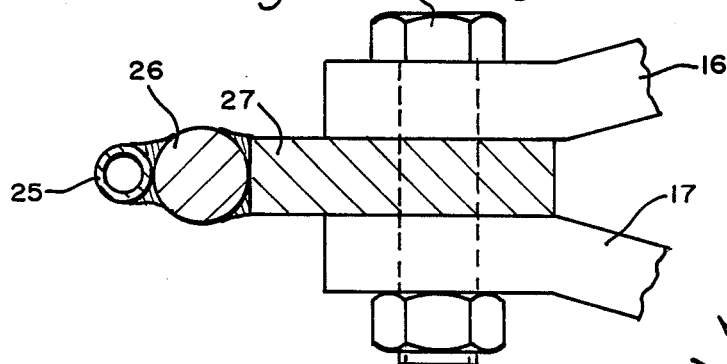
Figure 10:
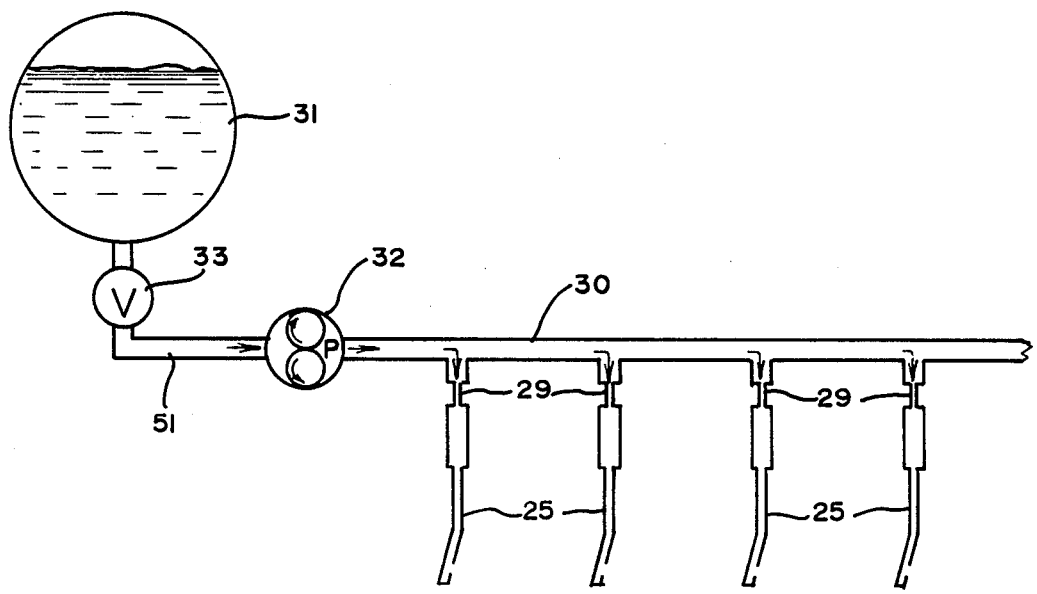

Extending rearwardly from fork 20 are normally horizontal bracket members 23 and 24 for carrying fertilizer injector tube 25 through the intermediacy of a similarly configured, stiffener rod 26 having a forwardly extending connector plate 27 to which the rearward ends of bracket members 23 and 24 are fastened by bolts 28, see particularly FIGS. 3 and 4. Injector tube 25 is preferably made of stainless steel. As illustrated, such tube 25 and stiffener rod 26 are joined together along their lengths. The upper end of tube 25 is connected by a flexible tube 29 to a fertilizer feed tube 30, illustrated schematically in FIG. 10, which connects with a supply tank 31 through a pump 32 and control valve 33.

Injection tube 25 and its stiffening rod 26 are kept as small in diameter as feasible considering necessary strength and rigidity. For example, tube 25 may have an inside diameter of $\frac{3}{8}$ of an inch and an outside diameter of $\frac{5}{8}$ of an inch, while rod 26 may be of standard steel rod stock $\frac{3}{4}$ of an inch in diameter. Both preferably extend downwardly to the lowermost point on the circumference of coulter blade 19, as shown particularly in FIG. 3, so as to deposit the fertilizer as low as possible in the cut 34 made by such blade, and are smooth surfaced so as to reject otherwise adherent soil.

Figure 6:
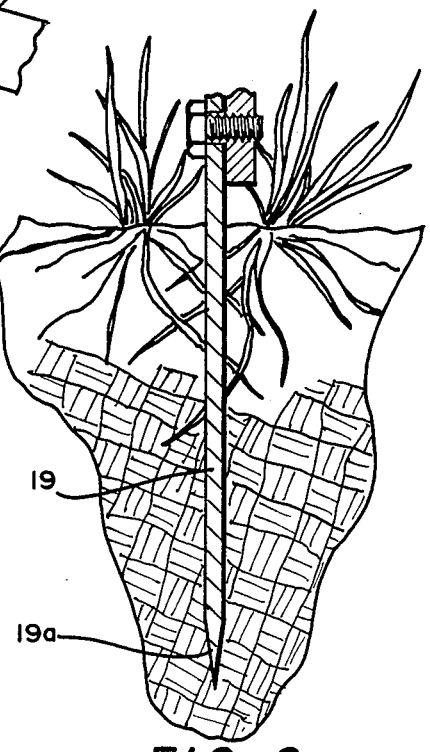

Coulter blade 19 is made as thin as possible, see FIG. 6, so cut 34 will tend to close by itself. For example, such blade 19 may be a disk of carbon steel eighteen inches in diameter and one-eighth of an inch in thickness sharpened around its circumferential margin, as at 19a, for cutting through grass, roots, and soil to a depth of from three to six inches. It should be flat, smooth-surfaced, and without flutes, so as to keep free of otherwise adherent soil.

Figure 5:
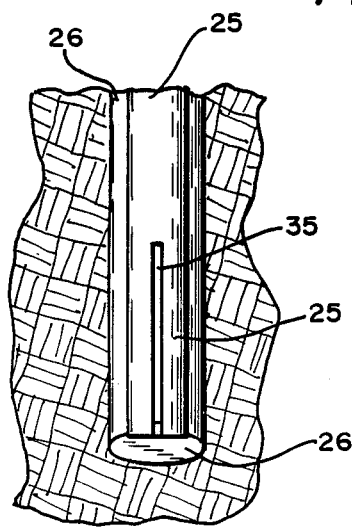

To maintain injection tube 25 open as it is pulled through cut 34 made by coulter blade 19, it is slotted upwardly at the rear from its normally open lower end, as at 35, FIG. 1 and 5.

Although the securement of coulter blade 19 to frame member 11a is reinforced by braces 36, FIGS. 2 and 3, between respective members 16 and 17 and respective leg members of fork 20, support of the ganged blades 19 is completed by the articulative attachment of their forks 20 to and between upper and rearward transverse frame members 11b and 11c, FIGS. 1 and 2. This is accomplished by sets of hanger bars 37 and 38, FIGS. 2 and 3, which bars are pivotally attached together, bar 37 being pivotally attached at opposite, depending ends 37a, respectively, to yoke bars 22, and bar 38 being pivotally attached intermediate its opposite, depending ends 38a, respectively, to and between frame members 11b and 11c, all by pins 39.

With the apparatus constructed as above and carrying tank 31 for fertilizer, its weight will ensure full depth penetration of coulter blades 19 into the soil as the apparatus is pulled across a field by tractor 14, sets of support wheels 12 being mounted by respective pivoted arms 40 and 41 to permit this. No attempt need be made to follow plant rows if such there be, for its has been found that, when fertilizer injection is carried out when seedlings are up only approximately two or three inches above ground surface, whatever way the apparatus travels across the field, no harm is done to overall planting. It has been found that in many instances, productivity is up from 50 to 300 percent over customary surface broadcasting of fertilizer, whether the fertilizer be of liquid or gaseous type. Moreover, injection in accordance with the invention can be all liquid, a combination of liquid and gaseous, or all gaseous. Also, it is advantageous to mix some types of liquid insecticides, such as "Dysiston", with the liquid fertilizer for injection into the soil therewith.

Figure 8:
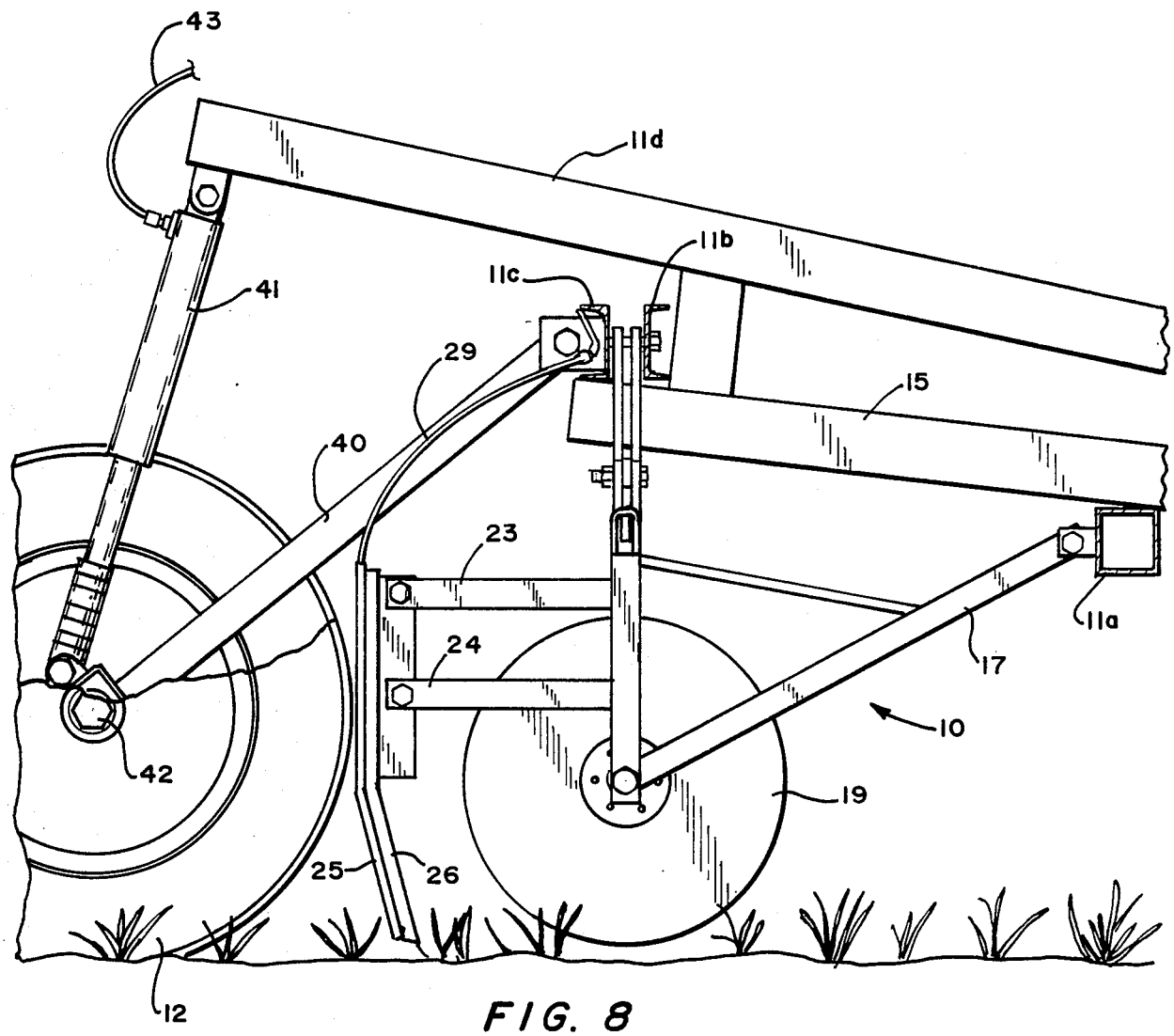
Figure 7:
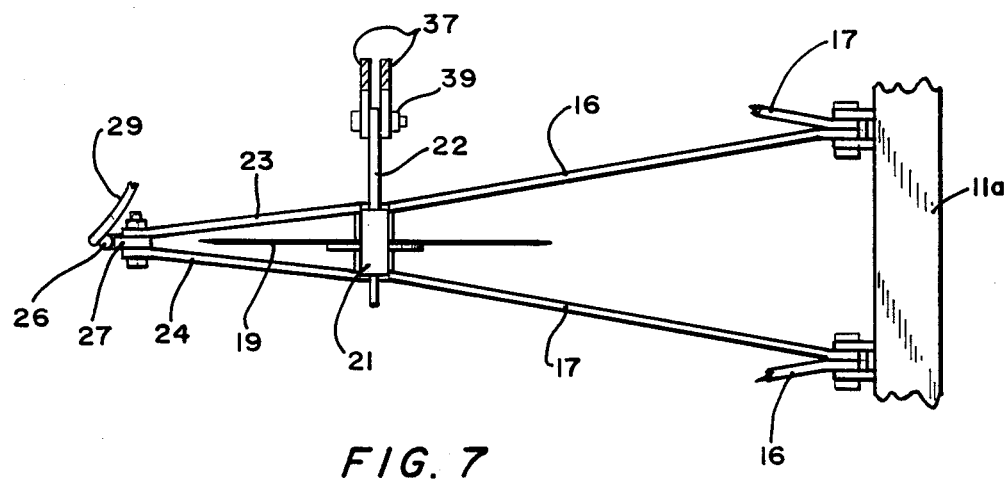

Arm 41 in each set of support wheels 12 is constructed as a hydraulic power cylinder operative between a frame member 11d and shaft 42 carrying the wheels 12, as illustrated in FIG. 8, and is supplied with pressurized hydraulic fluid from a suitable source of same (not shown) through tubing 43 under control of the operator seated on tractor 14 when it is desired to raise the implements 10 to transport positions as shown or to control depth of penetration into the soil.

It has been found desirable to pivot press wheels behind the injection tubes, respectively, of the implements, see press wheel 44 and its pivotal mounting 45, FIG. 3, to ride on the surface of the soil over the cuts and exert pressure to help close such cuts and retain the deposited fertilizer adjacent to the roots of seedling plants.

Figure 9:
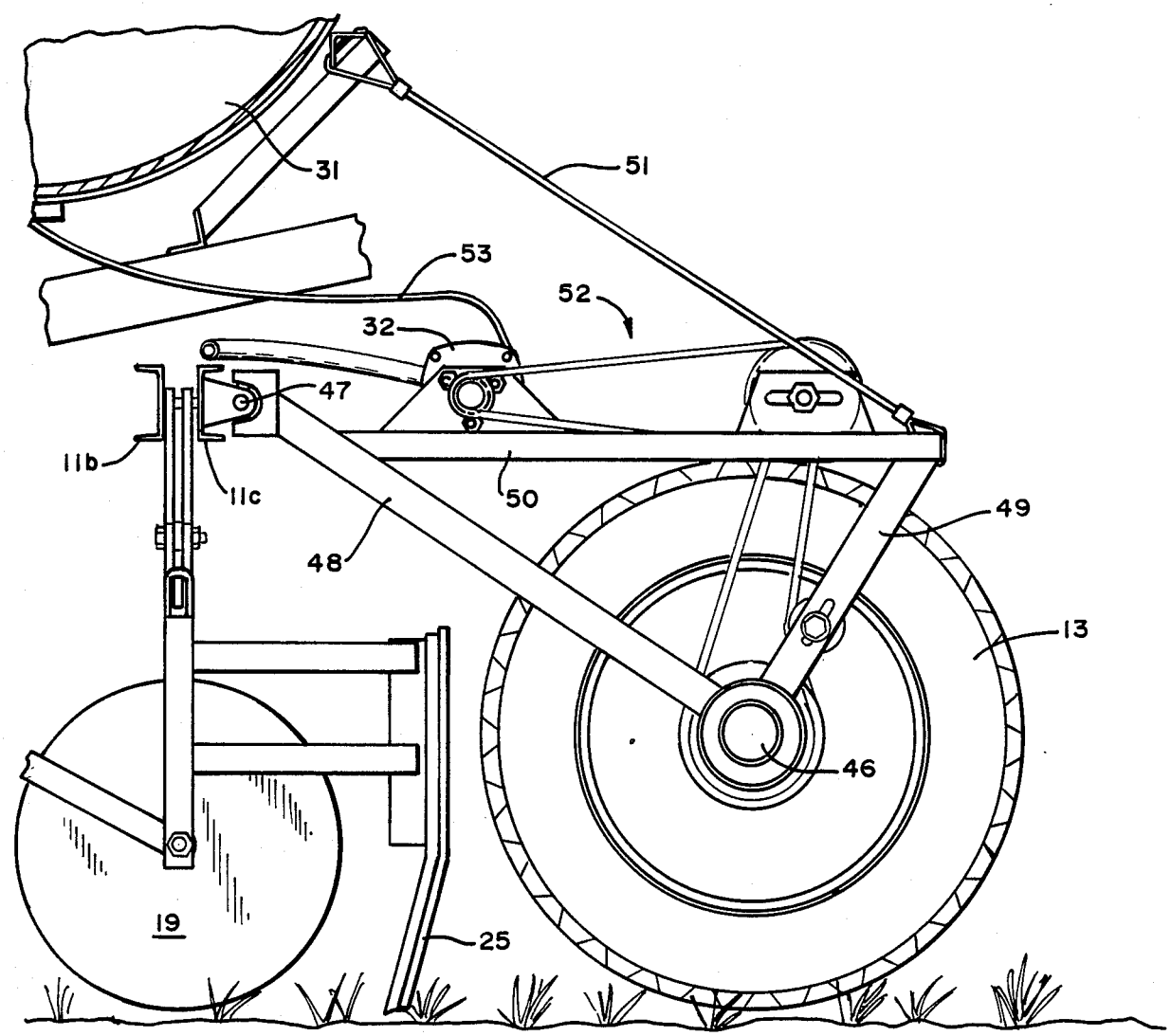

As illustrated in FIG. 9, intermediate wheel 13 is rotatably mounted on a shaft 46 under tank 31, and is pivotally fastened to frame member 11c at 47 by means of arms 48, 49, and 50 for up and down movement.

Intermediate wheel 13 is held at transport level by a cable 51 when the implements 10 are raised to that level by hydraulic power cylinder arms 41 but drop to ground level when such implements are lowered into working positions. At ground level, such wheel 13 powers hydraulic pump 32 by means of a chain and sprocket drive 52 to feed fertilizer passing thereto from tank 31 by way of piping 53 under pressure into the piping 30 and 29 leading to the respective injection tubes 25.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Agricultural apparatus for the injection of fertilizer into agricultural land comprising a frame adapted for travel across said agricultural land; a series of fertilizer injecting implements mounted in side-by-side ganged relationship on said frame transversely of the direction of travel, each of said implements providing a coulter blade of thin, flat disk formation made of a strong and durable material having smooth surfaces that are substantially of soil non-adherent character, a rigid fertilizer injector tube secured directly behind but in spaced relationship with said blade so as to penetrate to substantially the bottom of cuts in the soil of said agricultural land made by said blade, and structural reinforcement secured to and along the length of said tube for stiffening said tube, both said tube and said reinforcement having smooth surfaces that are substantially of soil non-adherent character; structural means mounting said implements on said frame for blade rotation and ground penetration, said structural means including for each implement a pair of mutually spaced, rearwardly convergent arms that are pivotally fastened to the frame at their forward ends and at whose rearward ends rotatably mount the coulter blade of the implement, and an inverted U fork member for said coulter blade extending upwardly from said rearward ends of said arms; sets of hanger bars pivotally suspending the forks of the coulter blades of the several implements from the frame, one set of the hanger bars comprising individual hanger bars pivotally secured at corresponding ends to respective yoke bars that are slidably fitted in receiving means of the forks of mutually adjacent coulter blades; means whereby said apparatus may be pulled across said agricultural land; means for carrying a supply of fertilizer to be injected into the soil of said agricultural land as the apparatus travels; and means interconnecting a carried supply of fertilizer with the respective injecting tubes of said implements.

2. An implement according to claim 1, wherein the tube of each implement is slotted at its rear from the bottom upwardly less than the maximum depth of cut by the blade in the soil of the agricultural land.

3. Apparatus according to claim 1, wherein another set of the hanger bars comprises individual hanger bars pivotally secured intermediate corresponding ends to the frame and pivotally secured at said corresponding ends to respective hanger bars of the one set of hanger bars intermediate the ends thereof.

4. Apparatus according to claim 1, including press wheels pivotally mounted behind the implements, respectively, of the series for riding on the surface of the soil over the cuts therein made by said implements and for helping to close said cuts in the soil.

* * * * *